March 3, 1931.  E. M. BROGDEN ET AL  1,795,275
PREPARATION OF FRESH FRUIT FOR MARKET
Filed Jan. 18, 1926
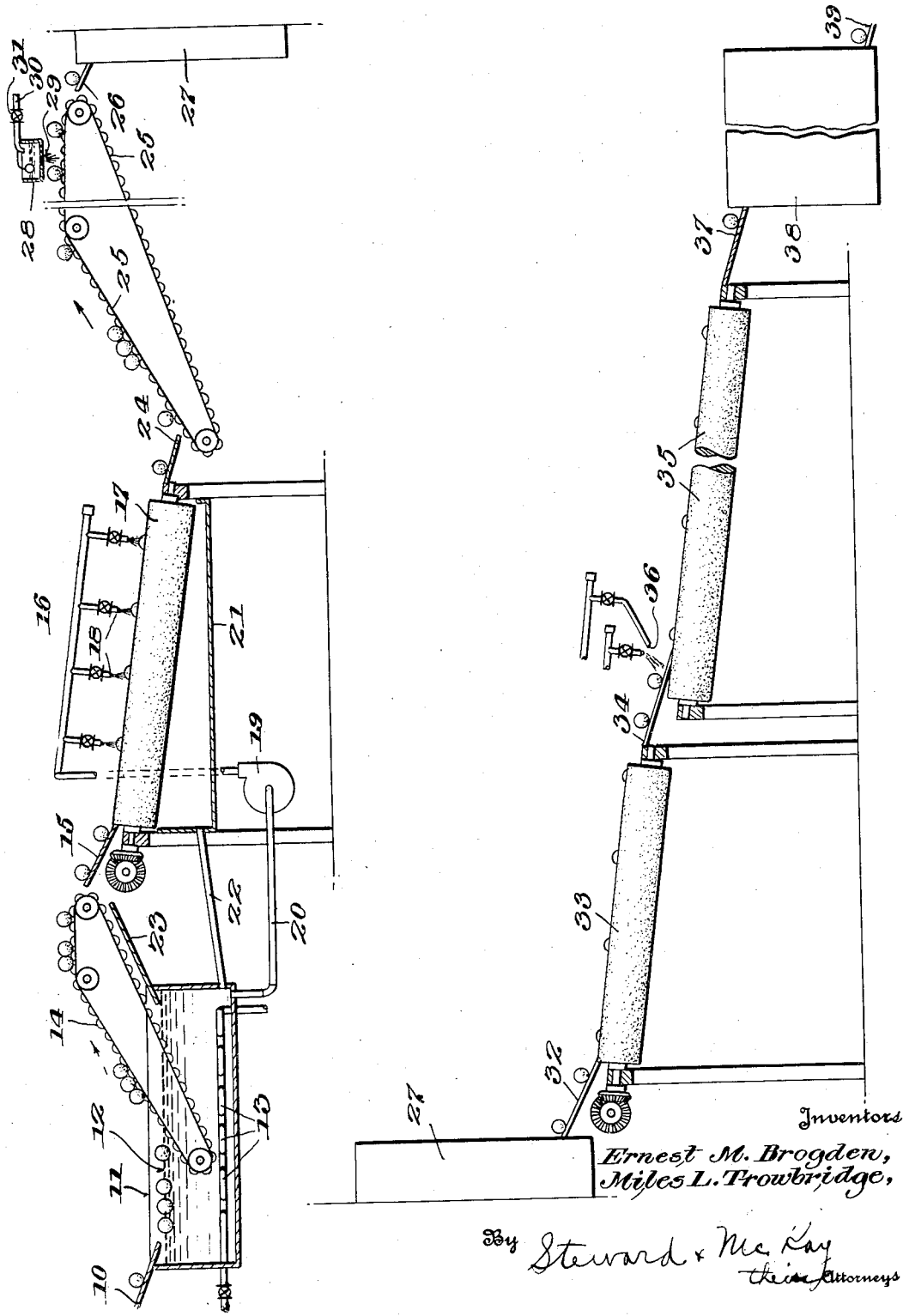
Inventors
Ernest M. Brogden,
Miles L. Trowbridge,
By Steward & McKay
their Attorneys Patented Mar. 3, 1931

1,795,275

UNITED STATES PATENT OFFICE

ERNEST M. BROGDEN, OF SANTA MONICA, AND MILES L. TROWBRIDGE, OF PALMS, CALIFORNIA, ASSIGNORS TO BROGDEX COMPANY, OF WINTER HAVEN, FLORIDA, A CORPORATION OF FLORIDA

PREPARATION OF FRESH FRUIT FOR MARKET

Application filed January 18, 1926. Serial No. 82,040.

This invention relates to preparation of fresh fruit for market; and in particular it relates to the treatment of fresh fruits that are marketed and ordinarily consumed in uncooked condition, especially oranges, lemons, grapefruit, tangerines, and other citrus fruits, in such manner that the destructive action of molds and other organisms producing decay or rot is prevented or inhibited either wholly or to such a substantial extent as greatly to prolong the marketable life of the fruit; the complete treatment most desirably but not necessarily also including a step of providing the fruit with a very thin film-like continuous coating of protective material comprising a waxy substance, such as paraffin for example.

The greatest present utility of the invention is in the treatment of fresh citrus fruits such as those above mentioned. The invention is also applicable, however, to the treatment of apples and other fruits that are attacked by mold or other rot organisms. Furthermore, the invention in its broader aspects extends to the treatment of vegetables, such as tomatoes or the like, that can be treated to advantage in accordance with the principles of the invention to be more fully hereinafter set forth, and accordingly the term "fruit" as herein employed is not to be understood as restricted to fruit in the narrow sense of this word but rather in a broad sense to include vegetables as well that are susceptible with advantage to treatment in accordance with the invention.

It is a well-known fact that in the shipping and marketing of citrus fruits, for example, heavy losses occur through decay in the form of blue mold rot, stem-end rot, and other forms of rot to which oranges and the like are subject to a greater or less extent. Decay in commercial shipments of citrus fruits amounts very often to from 5 to 10 per cent, and in many instances it is considerably higher, often running as much as 15 to 20 per cent if the fruit is "weak" as it is at certain seasons. Blue mold is responsible for the greater part of these decay losses. It is also well-known that until recently no practical solution of the problem of preventing or controlling the destructive action of blue mold and the like has been known, notwithstanding prolonged study and investigation of the problem by recognized experts in the art extending over many years. Careful handling of the fruit in picking and packing, in order to avoid scratches, bruises and other mechanical injuries, and thus to reduce the liability to infection by blue mold spores, has been the principal suggestion of value that such experts have advanced; and while the percentage of decay in fruit shipments can in some measure be kept down by careful handling, it cannot thereby be eliminated or prevented from being large in many instances. Shipment under ice, involving precooling and refrigeration, has also been suggested and serves to temporarily check blue mold growth while the fruit is in transit to market, but upon removal from refrigeration, the blue mold develops at an accelerated rate and destruction of infected fruit is even more rapid than where refrigeration has not been used. Refrigeration therefore is in effect merely an expedient for transferring the loss from the shipper to the receiver.

It has been found by the present applicants that by the application to the surface of fresh fruits of a solution of an alkaline hydroxide in proper concentration, decay in such fruits may be materially reduced, the alkaline hydroxide acting to retard or stop the growth or development of the organisms causing various forms of rot including those hereinabove mentioned. The action of the treating solution is especially effective if it be applied moderately warm, temperatures between 100° and 120° F. being suitable, and around 115° F. being good average practice. Various alkaline hydroxides may be employed within the scope of the invention. For example, a solution containing an alkali metal hydrate or hydroxide, such as sodium hydroxide, acts under proper conditions as an effective decay-retarding or inhibiting solution, but in using caustic alkali care should be taken to avoid the use of concentrations so high as to burn the skin of the fruit or otherwise adversely to affect its appearance or quality. In general, however, the alkalinity of a solution used in accordance with the principles of the invention should be at least as great as is equivalent to a content of 2 ounces of sodium carbonate per gallon. In employing sodium hydroxide, decay-retarding action is substantial, under proper conditions of operation and handling of the fruit, when the concentration is as low as one-half to one per cent by weight of sodium hydroxide in aqueous solution. Higher concentrations up to and including five per cent of sodium hydroxide by weight of the solution are also practicable to employ, but ordinarily lower concentrations, say from one to two per cent, are sufficiently effective in their decay-retarding action and are somewhat safer to use than higher concentrations. As a rule employment of concentrations in excess of five per cent is unnecessary and is often inadvisable because of the tendency of such higher concentrations to affect the color of the skin or otherwise to alter the appearance of the fruit.

The duration of the treatment of the fruit with the alkaline hydroxide solution may vary considerably in practice and is governed to some extent by the concentration of the solution and the temperature at which it is applied to the fruit. In any event the fruit should remain wet with the treating solution for a sufficient time to ensure thorough impregnation of exposed rind tissues with the alkaline reagent and entry of said reagent into all surface crevices and pores. With treating solutions containing one to two per cent of sodium hydroxide, for example, and assuming a treating temperature approximately 115° F., contacting the fruit for say two minutes with the warm treating solution is sufficient to obtain good results. With weaker solutions, or at lower temperatures, the treating period may be five minutes or more in length. The treatment may advantageously include thoroughly rubbing or scrubbing the fruit while it is wet with the treating solution since this facilitates thorough impregnation of the exposed rind tissues and thus enhances the inhibiting effect obtained against mold or other forms of rot.

The results obtained in the practice of the invention are usually most satisfactory where the fruit is initially treated with the alkaline solution before it has been washed or otherwise wetted with water or other liquid of non-mold-inhibiting character. This is because the exposed rind tissues of the fruit are ordinarily dried out or partially dried out by the time the fruit is to be put through the sequence of packing house operations and therefore are in a highly absorptive condition and ready to take up with avidity any liquid with which the fruit is brought into contact. By avoiding any wetting of the fruit prior to treatment with the mold-inhibiting solution, said solution can be relied upon to penetrate and impregnate the absorptive exposed rind tissues in its full strength and thus exercise a maximum mold-inhibiting effect; whereas if the exposed rind tissues are more or less saturated with wash water or the like before treatment with the alkaline solution, the action of the mold-inhibiting solution is materially less certain and effective and may even be practically nil under some circumstances. However, if precautions be taken to apply the alkaline solution to the fruit under super-atmospheric pressure, thus securing more complete and uniform impregnation of the exposed rind tissues, reasonably good results can be obtained even where the fruit has been previously washed or wetted with plain water. As stated, however, initial treatment of the unwashed or unwetted fruit is to be recommended as decidedly the better practice.

After treatment with the alkaline mold-inhibiting solution, the fruit may desirably be provided with a very thin film-like protective coating of waxy material for the purpose of maintaining the fruit in firm, plump and unwithered condition. While this further treatment of the fruit is not an essential feature of the invention in its broader aspects, it offers distinct advantages especially during those parts of the shipping season when the fruit is very ripe.

While the process of the invention may be carried out with the aid of various types of apparatus, one desirable practical form of apparatus installation that gives satisfactory results in treating oranges, for example, is shown more or less schematically and diagrammatically in side elevation in the accompanying drawing. In using this apparatus system to carry out the new process, fruit, which in this particular instance will be assumed to be unwashed fruit just as it is received from the grower, is delivered over chute board 10 into wash tank or soaking tank 11 containing a water solution of an alkaline hydroxide having the power to inhibit or retard the growth or development of the organisms causing stem-end rot, blue mold rot or other forms of decay. In the present example, the use of a 2 per cent solution of sodium hydrate or hydroxid may be assumed, the level of the liquid in the tank being indicated at 12. The solution may be suitably warmed, to a temperature of around 115° to 120° F., for example, by a suitable heating means such as steam coils 13. The fruit dumped into the soaking tank 11 floats gradually toward an elevator of any suitable type, conventionally indicated at 14, the fruit being thoroughly wetted with the treating solution en route. The elevator conducts the wet fruit up out of the tank and delivers it over chute board 15 to a fruit washer 16, which in the present instance comprises rotary cylindrical brush rolls 17 mounted substantially in the same plane and cooperating in one or more pairs to provide a fruit runway or runways inclined slightly downward from the receiving end of the washer device. As the fruit passes down along the brush rolls it is thoroughly rubbed thereby and at the same time is sprayed with more of the warm treating solution supplied through overhead spray jets 18 by a pump 19 which draws its supply through pipe 20 from soaking tank 11. The excess solution falls from the brush rolls of the fruit washer into a drip pan 21 and is returned through pipe 22 to the soaking tank. A drip board 23 is also provided to return drip from the elevator 14 to said tank.

After receiving a thorough rubbing and scrubbing in the washer 16, the cleansed and treated fruit is delivered over a chute board 24 to suitable conveyor means indicated conventionally at 25. Advantageously this conveyor means may be of such character and arrangement that the fruit, wet with the alkaline hydroxide solution, remains upon it for a substantial period of time sufficient to ensure thorough and efficient action of the mold-inhibiting agent on the fruit. Said conveyor may therefore be relatively long and may also advance the fruit circuitously to the next stage of operations. The conveyor discharges fruit over chute board 26 to drier of any well known suitable type indicated conventionally at 27. It is sometimes advantageous, although not essential in the broader aspects of the invention, to subject the fruit, prior to its entry into drier 27, to a carefully restricted and controlled rinsing with plain water to remove superficial excess of the alkaline hydroxide. This may be accomplished for instance, by locating a rinsing or sprinkling device over the conveyor 25 slightly in advance of the point at which it delivers the fruit to the drier. In the present example, the device may comprise a small tank 28 having a line of discharge outlets 29 in its bottom extending transversely of said conveyor. Plain water is supplied to the tank through pipe 30 and a constant level is maintained in the tank by means of float-controlled valve 31. In this way exactly the right amount of rinsing water may be showered on the fruit as it passes under the rinsing device.

In the drier 27, the sensible surface moisture of the fruit is removed. If the fruit was rinsed before being dried, as in the typical example just given, it usually requires no further treatment before application of the waxy protective material, which, as already indicated, is optional although desirable. Where the fruit has not been so rinsed, a further treatment in the way of rubbing is sometimes desirable, although not essential. To this end, the fruit leaving drier 27 may be delivered over chute board 32 to suitable brushing and rubbing means which may desirably be of the brush roll type indicated generally at 33, the general construction of which may be similar to the washer unit 16, the spray heads being omitted, however, and the surface of the rotary brush rolls being advantageously of soft bristles such as horsehair.

From the brush roll mechanism 33, the fruit then rolls down over chute board 34 to another brush roll mechanism indicated generally at 35, above which, near the upper or receiving end, is located suitable spraying means, such as air brushes indicated conventionally at 36, said air brushes serving to spray fluid coating material in small quantity down upon the fruit as it enters units 35. Most desirably this coating material comprises paraffin and a light mineral oil solvent thereof thoroughly intermingled to provide a thinly fluid mixture that can be spread in an extremely thin film over the fruit by the action of the brush rolls.

After receiving a small amount of coating material from the air brushes upon entering brush roll unit 35, the fruit continues to pass down the brush roll runway or runways and is subjected to a very thorough rubbing by the horsehair surfaces thereof, the coating material applied to each fruit being spread out into an extremely thin protective film coating. Upon leaving unit 35, the fruit passes over chute board 37 and may optionally travel through a fruit drier 38 where the solvent in the paraffin composition, if a volatile solvent is employed, may be evaporated to a greater or less extent. Leaving the drier over chute board 39, the fruit then goes to the graders and sizers and is ready to be shipped in the usual manner except that precooling and refrigeration are unnecessary, provided the cars in which the fruit is shipped are reasonably well ventilated. Precooling and refrigeration are also unnecessary where the fruit does not receive an application of paraffin composition.

Where it is desired to apply the treating solution to the fruit under pressure, this may be effected in various ways. For instance, the passage of the fruit through the tank 11 may be so regulated and controlled as to cause the fruit to pile up several layers deep in the treating tank, thus subjecting the lower layers to a hydrostatic pressure corresponding to a submergence of say 18 inches to 2 feet or more, and provision may be made to agitate the fruit in the tank in such manner as to cause the upper and lower layers of fruit to exchange places and thus expose all the fruit passing through the tank to the aforesaid hydrostatic pressure of the treating solution. It is also feasible to employ mechanical means to maintain the fruit submerged well below the surface of the solution throughout its travel through the tank 11 which, of course, may be much longer than is diagrammatically indicated in the drawings. Such expedients for applying the solution under pressure require no further explanation here as in and of themselves they constitute no part of the present invention.

An alkaline hydroxide of suitable character not only exercises a pronounced mold-inhibiting action when employed in accordance with the principles of the invention as above set forth, but it is also aids efficiently in cleansing the fruit from adherent foreign matter especially if this be of an oily character as it frequently is. Its primary function in the practice of the invention, however, is its mold-inhibiting action as hereinbefore pointed out.

The present application embodies subject matter disclosed in our prior copending application Serial No. 12,778, filed March 2, 1925.

What is claimed is:

1. In the preparation of fresh fruit for market, the process of protectively treating the fruit for prevention of blue mold decay and the like which comprises subjecting the fresh fruit to the action of a warm aqueous mold-inhibiting solution of an alkaline hydroxide, said solution possessing a degree of alkalinity at least as high as that equivalent to the employment of 2 ounces of soda ash per gallon of water.

2. In the preparation of fresh fruit for market, the process of protectively treating the fruit for prevention of blue mold decay and the like which comprises frictionally applying to the fresh fruit an aqueous mold-inhibiting solution containing sodium hydroxide, and possessing a degree of alkalinity at least as high as that equivalent to the employment of 2 ounces of soda ash per gallon of water.

3. In the preparation of fresh citrus fruit for market, the process which comprises subjecting the fresh fruit to the action of an aqueous mold-inhibiting solution containing sodium hydroxide and possessing a degree of alkalinity at least as high as that equivalent to the employment of 2 ounces of soda ash per gallon of water, said solution being maintained at a temperature above 100° F. but insufficiently high to scald or cook the fruit, and the fruit remaining wet with said solution for from 2 to 15 minutes.

4. In the preparation of fresh fruit for market, the process as defined in claim 3 further characterized by the fact that said fruit is subjected to the stated treatment without previous washing or wetting with a non-mold-inhibiting liquid.

5. In the preparation of fresh fruit for market, the process which comprises subjecting fresh fruit to the action of an aqueous solution containing at least 1 ounce of sodium hydroxide per gallon, said solution being applied in heated condition with the aid of pressure.

6. A process for preparing fresh fruits and vegetables for market which comprises the application to the surface of such articles of a solution of an alkaline hydroxide, to retard the growth or development of the organisms causing stem-end rot, blue-mold rot or other forms of decay.

7. In the preparation of fresh fruit for market, the process which comprises thoroughly wetting the fresh fruit with a solution containing a substantial quantity of an alkali metal hydroxide, such as sodium hydroxide, and possessing a degree of alkalinity at least as high as that equivalent to the employment of 2 ounces of soda ash per gallon of water and allowing the solution to dry on the fruit in amount sufficient to provide an alkaline residue of solid material having a protective action against decay.

8. In the preparation of fresh fruit for market, the process as defined in claim 3, further characterized by the fact that the solution is allowed to dry on the fruit in amount sufficient to provide an alkaline residue of solid material having a protective action against decay.

In testimony whereof we hereunto affix our signatures.

ERNEST M. BROGDEN.
MILES L. TROWBRIDGE.